United States Patent [19]

Lynn et al.

[11] 4,278,646

[45] Jul. 14, 1981

[54] OXIDATIVE REMOVAL OF HYDROGEN SULFIDE FROM GASEOUS STREAMS

[75] Inventors: Scott Lynn, Walnut Creek, Calif.; Bernard J. Dubs, Berre l'Etang, France

[73] Assignee: The Regents of the University of California, Berkeley, Calif.

[21] Appl. No.: 92,041

[22] Filed: Nov. 7, 1979

Related U.S. Application Data

[63] Continuation of Ser. No. 891,545, Mar. 30, 1978, abandoned.

[51] Int. Cl.³ ............................................. B01D 53/34
[52] U.S. Cl. ................................... 423/226; 423/224; 423/228; 423/573 G
[58] Field of Search ............ 423/226, 228, 229, 573 L, 423/573 G

[56] References Cited

U.S. PATENT DOCUMENTS

| 3,068,065 | 12/1962 | Hartley et al. | 423/228 |
| 4,009,251 | 2/1977 | Meuly | 423/226 X |
| 4,036,942 | 7/1977 | Sibeud et al. | 423/226 |

OTHER PUBLICATIONS

Smith, "The Sequestration of Metals", Chapman & Hall, Ltd., London, 1959, p. 23.

*Primary Examiner*—Earl C. Thomas
*Attorney, Agent, or Firm*—Christie, Parker & Hale

[57] ABSTRACT

Hydrogen sulfide is removed from a gaseous stream by contacting the stream with an aqueous solution of ferric ion chelated with an aminopolycarboxylic acid at a pH of 3.5 to 5, whereby hydrogen sulfide is oxidized to elemental sulfur and chelated ferric ion is reduced to chelated ferrous ion. The solution also contains ammonia or an aliphatic, alicyclic, or heterocyclic primary or secondary amine in a sufficient proportion to maintain chelated ferrous ion in solution at a pH of 3.5 to 5. The chelated ferric ion is regenerated by contacting the solution with a gas containing elemental oxygen.

34 Claims, No Drawings

OXIDATIVE REMOVAL OF HYDROGEN SULFIDE FROM GASEOUS STREAMS

The United States Government has rights in this invention pursuant to Grant ENG75-02707 awarded by the National Science Foundation.

CROSS REFERENCE TO RELATED APPLICATIONS

This is a continuation Ser. No. 891,545, filed Mar. 30, 1978, now abandoned.

BACKGROUND OF THE INVENTION

This invention relates to the oxidative removal of hydrogen sulfide from gaseous streams with the use of a chelated iron redox catalyst system. Specifically, the invention relates to the stabilization of such a system for operation at low pH in the range of 3.5 to 5.

The removal of hydrogen sulfide and alkyl mercaptans from liquid and gaseous streams, such as the waste gases liberated in the course of various industrial chemical processes, for example, in the pulping of wood, and in petroleum refining, has become increasingly important in combating atmospheric pollution. Such waste gases not only have an offensive odor, but they may also cause damage to vegetation, painted surfaces, and wild life, besides constituting a health hazard to humans. The authorities have increasingly imposed lower and lower tolerances on the content of such gases vented to the atmosphere, and it is now imperative in many localities to remove virtually all of the hydrogen sulfide and alkyl mercaptans, under the penalty of an absolute ban on continuing operation of the plant.

The quantities of hydrogen sulfide and mercaptans in waste gases are often not very high. Dunn U.S. Pat. No. 3,071,433 dated Jan. 1, 1963, indicates that the stack gases obtained in the concentration of black liquor, the waste pulping liquor of the kraft pulping process, contain from 500 to 2,000 parts per million of hydrogen sulfide. However, hydrogen sulfide can be detected by humans at a concentration of approximately 0.01 part per million. The result is that an extremely efficient process for the removal of hydrogen sulfide and alkyl mercaptans is required for effective capture of small amounts of these materials.

The use of chelated iron redox catalysts for the oxidative removal of hydrogen sulfide from gas streams and conversion of the hydrogen sulfide to elemental sulfur is well known in the art. Although the use of the chelated iron catalyst system at a pH ranging from 3 to 11 has been disclosed, the prior art has consistently emphasized the advantages of operating such a catalyst system at substantially neutral or alkaline pH. In such processes, a gas stream containing hydrogen sulfide is contacted with an aqueous solution of chelated ferric ion. The solution absorbs the hydrogen sulfide and converts it essentially quantatively to elemental sulfur which can be separated from the solution by filtration, centrifuging, or the like. The ferric ion, which is reduced to ferrous ion by reaction with the hydrogen sulfide, is then regenerated by contacting the solution with a gas containing elemental oxygen, such as air. The art has stated that both the absorption of hydrogen sulfide and the regeneration of the solution with elemental oxygen occur most efficiently at neutral or alkaline pH.

However, it has been recognized that one disadvantage of operating at neutral or alkaline pH is that a portion of the sulfur, up to several percent, can be further oxidized to various oxides of sulfur. These oxides of sulfur are undesirable by-products and have the effect of lowering the pH of the solution, thus requiring the use of buffers or continued addition of alkali to maintain the solution within the desired alkaline pH range.

The art has recognized an advantage in the use of the chelated iron catalyst system at low pH, namely, that the objectionable oxides of sulfur are not formed. However, a disadvantage of operating at low pH is that many of the best iron chelates such as the iron-nitrilotriacetic acid and the iron-ethylenediamine tetracetic acid chelates are unstable at such low pH and tend to precipitate from solution, thus lowering the effectiveness of the catalyst. For this reason the art has directed its attention to operation in the neutral and alkaline pH regions. A number of approaches have been described for minimizing the formation of oxides of sulfur when operating at alkaline pH.

U.S. Pat. No. 4,036,942 to Sibeud, et al describes a process for removing hydrogen sulfide and alkyl mercaptans from gaseous streams by reaction with oxygen in the presence of a polyvalent metal chelate with an amino acid in an aqueous solution containing an organic amine. Aminopolycarboxylic acid chelating agents of the alkylenediamine and phenylenediamine types are described, such as ethylenediamine tetraacetic acid. The use of aliphatic, alicyclic, and heterocyclic primary, secondary and tertiary amines is also described. The patent states that the oxidation of ferrous ion to ferric ion by oxygen is slow at pHs of from about 1 to 5. Thus the patent teaches operation at a preferred pH of 6.8 to 10. The addition of an amine to the chelated iron solution is said to inhibit the formation of acidic oxides of sulfur at a pH in the preferred range of 6.8 to 10. The use of an amine is also said to enhance the absorption of hydrogen sulfide by the catalyst solution.

U.S. Pat. No. 4,009,251 to Meuly describes a process for removal of hydrogen sulfide from gas streams with an aqueous solution of iron chelated with an aminocarboxylic acid such as nitrilotriacetic acid or ethylenediamine tetracidic acid at a pH in the range of 3 to 11, preferably 7 to 11. The formation of acidic oxides of sulfur with the consequent drop in the pH of the catalyst solution during use is inhibited by the addition of an alkali metal, alkaline earth metal, ammonium, or amine salt of a non-oxidizing acid having a pH within a range of from about 1.2 to about 6. Such acids include formic acid, citric acid, acetic acid, and propionic acid. The use of aliphatic, alicyclic, and heterocyclic primary, secondary, and tertiary amine salts of such acids is also described. Although the patent states that the pH of the system should be within a range of from about 3 to about 11, the most efficient range is said to be be from about 7 to about 11, preferably from about 8 to about 10. The patent also states that a free organic amine can be used to adjust the pH of an acidic chelate solution to within this range.

U.S. Pat. No. 3,933,993 to Salemme describes the use of a chelated iron solution having an iron concentration of at least about 0.5 moles per liter and a pH greater than 7. The use of ethylenediamine tetracetic acid as chelating agent with a buffer such as sodium cabonate or potassium phosphate is described. The patent describes the advantages of using a concentrated solution of the iron chelate but does not suggest the use of such solutions at acidic pH.

U.S. Pat. No. 3,676,356 to Roberts et al describes the use of iron chelated with nitrilotriacetic acid at pH of 5 to 6.5. In order to maintain the desired pH it is necessary to add on a continuous or intermittent basis an alkaline buffering agent, such as an alkali metal or ammonium carbonate or bicarbonate or an amine salt, such as a salt of diethanolamine. The use of an iron nitrilotriacetic acid chelate solution containing ammonia or an aliphatic, alicyclic, or heterocyclic primary or secondary amine at a pH of 3.5 to 5 is not described. Although the use of the buffering agent is said to increase the life of the chelate at a pH in the range of 5 to 6.5, the process has the disadvantage that the amount of buffering agent in the solution substantially increases as the process is continued, and the catalyst solution must eventually be replaced.

U.S. Pat. No. 3,097,925 to Pitts, Jr., et al describes the use of iron chelated with an aminocarboxylic acid such as ethylenediamine tetraacetic acid or N,N-dihydroxyethylglycine at a pH of from 1 to 13, preferably 7 to 10. The patent does not address the problem of the instability of such chelates at high concentration and low pH.

British Pat. No. 999,799 states that hydrogen sulfide is absorbed rapidly by an aqueous solution of iron chelated with hydroxyethylenediamine triacetic acid at a pH above about 2.5. Although the patent recognizes that an organic base such as triethanolamine can prevent precipitation of ferric hydroxide if a chelated iron solution is used at a comparatively high pH value, there is no suggestion that the use of primary and secondary amines can prevent the precipitation of ferrous ion from solution at a comparatively low, acidic, pH.

SUMMARY

In accordance with the present invention, it has now been found that an aqueous solution of iron chelated with an amino polycarboxylic acid, notably nitrilotriacetic acid, is unexpectedly stable at a pH in the range of from about 3.5 to 5 when the solution also contains ammonia or an aliphatic, alicyclic, or heterocyclic primary or secondary amine in a proportion sufficient to prevent precipitation of iron from the solution. Surprisingly, the solution is stable over a long period of time and may be used and regenerated repeatedly without the need for continued addition of an amine or amine salt to maintain the pH of the solution with the desired range.

In practice of this invention, such as chelated iron catalyst solution is contacted with a gas stream containing hydrogen sulfide and/or alkyl mercaptans. Chelated ferric ion in the solution is reduced to chelated ferrous ion. Hydrogen sulfide is absorbed from the gas stream and oxidized to particulate, elemental sulfur in the solution. Alkyl mercaptans are converted to less odorous alkyl disulfides, which collect as oil in the catalyst solution. The solution is regenerated by contacting it with an oxygen-containing gas, such as air, which oxidizes the ferrous ion back to ferric ion.

DETAILED DESCRIPTION

Catalyst solutions of the present invention are aqueous solutions of iron chelated with an aminopolycarboxylic acid and have a pH in the range of from about 3.5 to 5. The solution also includes an aliphatic, alicyclic or heterocyclic primary or secondary amine or ammonia in a proportion sufficient to prevent precipitation of iron from the solution during use. The use of an aqueous solution of an iron-aminopolycarboxylic acid chelate at a pH of about 3.5 to 5 for the oxidative absorption of hydrogen sulfide from gas streams has a number of significant advantages over processes using iron chelates as described in the prior art.

One advantage is that the organic amine or ammonia added to prevent iron precipitation is present in the solution in the salt form, which is non-volatile. Thus, loss of the amine stabilizer by evaporation is substantially avoided. The second advantage is that at such a low pH, the formation of acidic oxides of sulfur is substantially completely avoided. Because essentially no oxides of sulfur are formed, there is no need for continued addition of a buffering agent or an amine to maintain the pH of the solution. Thus the buildup of salts or buffering agents which can render the catalyst solution unuseable after a time is avoided.

Furthermore, by virtue of its low pH, the solution does not absorb substantial amounts of carbon dioxide and can thus be used to absorb hydrogen sulfide from gas streams also containing carbon dioxide without loss of effectiveness of the catalyst solution.

The low operating pH also prevents ferrous ion from reacting directly with $H_2S$ to form solid ferrous sulfide.

The amine stabilizer i.e., the ammonia or the organic amine, in catalyst solutions prepared in accordance with the present invention can prevent the precipitation of ferrous ion from solution despite the low pH, even when the chelated ferrous ion concentration is as high as 1 mole per liter or higher. This allows great flexibility in use of the catalyst solution. Because the chelated iron is fully solubilized in both the ferric and the ferrous forms, a solution of chelated ferric ion having a high concentration can be used to absorb hydrogen sulfide from a gas stream until as much as 80% or more of the iron is reduced to the ferrous form. The catalyst solution can then be treated for recovery of the elemental sulfur therefrom, and contacted with an oxygen containing gas in a separate apparatus for regeneration of the ferric ion content. Thus dilution of the hydrogen sulfide containing gas stream with the oxygen containing gas stream is avoided. Because the concentrated catalyst solution can absorb as much as 10 to 15 grams of sulfur per liter of solution, the volume of catalyst solution needed to treat a given volume of gaseous stream is relatively low and consequently capital outlays for gas-liquid contacting apparatus for both the hydrogen sulfide absorption step and the ferric ion regeneration step are relatively low.

Iron chelate catalyst solutions used in practice of this invention have a total dissolved iron content of from about 0.01 to 1 mole per liter or more, for example, 0.1 to 0.9 moles per liter. Preferably, the solution contains at least about 0.5 mole per liter, for example, about 0.5 to 0.8 mole per liter. The solution can be prepared from any suitable water soluble ferrous or ferric salt such as the sulfate, chloride, and nitrate salts, or from iron oxide or iron metal with the use of a suitable acid to bring the iron into solution.

Chelating agents used in practice of this invention are aminocarboxylic acids having at least two carboxylic acid groups. The value of the second acid constant is 10-5 or larger.

One group of aminopolycarboxylic acids used in the practice of this invention is represented by the structural formula

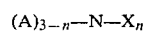

wherein n is 2 or 3; X is selected from the class consisting of acetic acid and propionic acid groups; and A is selected from the class consisting of 2-hydroxyethyl, 2-hydroxypropyl, and alkyl groups having from 1 to about 4 carbon atoms.

Another group of useful aminopolycarboxylic acids is represented by the structural formula

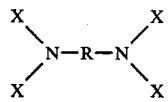

wherein from 2 to 4 of the groups X are selected from the class consisting of acetic acid and propionic acid groups; from zero to 2 of the groups X are selected from the class consisting of 2-hydroxyethyl, 2-hydroxypropyl, and $-CH_2CH_2NX_2$ and R is selected from the class consisting of ethylene, propylene, isopropylene, 1,2-cyclohexylene, and 1,2-phenylene groups.

Specific examples of useful aminopolycarboxylic acids include diglycine, hydroxyethyldiglycine, nitrilotriacetic acid; carboxylic acid derivatives of ethylenediamine, diethylene triamine, 1,2-propylenediamine, and 1,3-propylenediamine, such as ethylenediamine tetracetic acid (EDTA). 2-hydroxyethyl ethylenediamine triacetic acid (HEDTA), diethylenetriamine pentacetic acid (DETPA); and carboxylic acid derivatives of cyclic 1,2-diamines such as 1,2-diaminocyclohexane-N,N-tetraacetic acid, and 1,2-phenylenediamine-N,N-tetraacetic acid. Salts of these acids, such as alkali metal salts, may also be used.

Nitrilotriacetic acid (NTA) is an especially preferred chelating agent in practice of this invention because it permits efficient absorption of hydrogen sulfide from gas streams and efficient regeneration of ferric ions and because, when stabilized with ammonia or an organic amine as hereinafter described, both Fe+3-NTA and Fe+2-NTA chelates are stable at high concentration at the low pH used in practice of this invention.

The chelating agent is used in a proportion at least about 1 mole per mole (or gram atom) of iron in the solution. Preferably the chelating agent is incorporated in minor excess, for example, 5 to 10 mole percent excess, with respect to iron. Higher proportions of chelating agent may also be used.

In addition to iron ions and an aminopolycarboxylic chelating agent, the catalyst solution includes ammonia or an aliphatic, alicyclic, or heterocyclic, primary or secondary amine in a proportion sufficient to maintain the chelated iron ion, especially the chelated ferrous ion, in solution.

Useful amines are water-soluble, or at least soluble in the catalyst solution in the desired proportion at the pH range of 3.5 to 5. The desired proportion depends upon the iron content of the solution, the anticipated concentration of ferrous ion in the solution during use, and upon the nature of the amine added, as will be discussed in further detail below. Useful amines include lower alkyl and cycloalkyl amines such as methylamine, ethylamine, isopropylamine, n-butylamine, isobutylamine, dimethylamine, diethylamine, methylethylamine, n-pentylamine and cyclohexylamine; hydroxyalkylamines such as ethanolamine, diethanolamine, n-propanolamine, and the like; heterocyclic amines such as morpholine and piperidine; and alkylenediamines and polyamines such as ethylenediamine, diethylaminetriamine, triethylenetetramine, propylenediamine, dipropylenetriamine, 1,2-diaminocyclohexane.

It is believed that the function of the ammonia or the organic amine in catalyst solutions of the present invention is to maintain in solution the chelated ferrous ion formed by the oxidation of hydrogen sulfide with chelated ferric ion. Thus, the desired proportion of organic amine or ammonia in the solution is related to the expected concentration of ferrous ion to be encountered under actual conditions of use. For example, in a two-stage process where the catalyst solution is first contacted with a gas stream containing hydrogen sulfide, and then in a separate step is contacted with oxygen containing gas for regenerating the solution, the solution may be contacted with the hydrogen sulfide containing gas until as much as 80 percent or more of the iron is reduced to the ferrous form. In a one-step process where the catalyst solution is contacted continuously with a gas stream containing hydrogen sulfide and also an oxygen-containing gas, either in the same reaction vessel or in separate reaction vessels through which the solution is continually recirculated, the proportion of iron in the ferrous state can vary widely depending upon the chosen operating parameters. Ordinarily the proportion of iron in the ferrous form in a continuous system is maintained at an intermediate level, for example, 25 to 75 percent or 40 to 60 percent.

With these considerations in mind, a sufficient proportion of the organic amine or ammonia is included in the catalyst solution to maintain in solution the highest anticipated concentration of chelated ferrous ion. Ammonia is used preferably in a proportion of at least about 1 mole per mole of chelated ferrous ion. Mono and dialloyl and hydroxyalkyl amines such as methylamine, ethylamine, diethylamine, ethanolamine, diethanolamine, and cyclohexylamine are used in a proportion of at least about 0.6 mole per mole of chelated ferrous ion. Polyamines such as ethylenediamine, propylenediamine, diethylenetriamine, and triethylenetetramine are included in a proportion of at least about 0.3 moles per mole of chelated ferrous ion. Higher proportions of the amines or ammonia can be used if desired, but the abovementioned proportions are sufficient.

Although the Sibeud et al patent describes the use of primary, secondary and tertiary amines in a catalyst solution of iron chelated with an alkylenediamine-type of chelating agent such as ethylenediamine tetracetic acid, or diethylenetriamine pentacetic acid at a preferred pH range from 6.8 to 10, it has surprisingly been found that tertiary amines such as triethylamine or triethanolamine, are not effective in preventing the precipitation of chelated ferrous ions in the pH range used in practice of the present invention, i.e., from about 3.5 to 5. This suggests that the amines may perform a different function at the low pH used in the practice of the present invention than amines perform at the higher pH of 6.8 to 10 used in practice of the Sibeud et al process.

Both the aminopolycarboxylic acid chelating agent and the organic amine or ammonia may be added to the catalyst solution either in their free forms or as soluble salts, such as alkali metal salts of the chelating agents or mineral acid salts of the amines or ammonia. Strong acid salts of the organic amine or ammonia, such as sulfates, chlorides, nitrates and the like, are preferred over weak acid salts such as acetates or formates, to produce catalyst solutions having a pH in the desired range of about 3.5 to 5.

The catalyst solution may be prepared by dissolving a suitable water-soluble ferrous or ferric salt, or by dissolving iron oxide or metallic iron in an appropriate acid, adding the aminopolycarboxylic acid chelating agent, either in the free acid or the salt form, and then adding the organic amine or ammonia, either in the free form or as a salt. After the iron, chelating agent, and organic amine or ammonia are incorporated, the pH of the solution is adjusted to within the range of 3.5 to 5 with the use of an inorganic acid or base such as sodium hydroxide, sodium carbonate, sulfuric acid, hydrochloric acid, or nitric acid. When a ferrous salt is used, the pH of the solution is maintained above about 5 until after addition of the organic amine or ammonia in order to avoid premature precipitation of chelated ferrous ion.

Gas streams containing hydrogen sulfide which may be treated in accordance with practice of this invention are produced in a wide variety of industrial chemical processes, such as petroleum refining, wood pulping and papermaking, coal desulfurization, coal gasification, coal liquefaction, coke making, and metal refining. Hydrogen sulfide is present in natural gas and in the effluent gases from many geothermal power plants.

Gas streams contaminated with hydrogen sulfide and alkyl mercaptans are also produced in processes such as viscose manufacture, sewage treatment, sulfuretting fatty oils, and producing organic sulfur compounds.

In addition, the well-known Claus process for conversion of hydrogen sulfide to elemental sulfur produces a tail gas which contains hydrogen sulfide in excess of pollution standards. These gas streams, and others contaminated with hydrogen sulfide, can be treated in accordance with practice of this invention for removal of hydrogen sulfide therefrom. The hydrogen sulfide content of gas streams thus treated can be reduced to as little as 1 part per million or less. Thus any gas stream containing more than about 1 part per million of hydrogen sulfide, for example, up to 50 percent or even 100 percent hydrogen sulfide, can be treated beneficially in accordance with this invention to convert the hydrogen sulfide to elemental sulfur.

Many gas streams which are contaminated with hydrogen sulfide also contain quantities of alkyl mercaptan which can have a strong, objectionable odor. When such gas streams are treated in accordance with this invention, the alkyl mercaptans are converted to alkyl disulfides which are less volatile than the mercaptans and also less odorous. The alkyl disulfides collect as in immiscible oil in the catalyst solution and can be separated therefrom by any common technique such as centrifugation or decantation.

In practice of this invention, a gas stream containing hydrogen sulfide is contacted with the iron chelate catalyst solution intimately for a time sufficient to reduce the hydrogen sulfide content of the gas stream. Any gas-liquid contact system which insures good contact between the phases can be used. In a continuous-flow system, cocurrent, countercurrent and cross-current flows can be used. Gas scrubbers can be used, as well as spray scrubbers or towers, perforated plate towers, wetted wall columns, bubble-cap plate towers, sieve plate towers, packed towers, turbogas mixers, orifice-column mixers, injectors, jet mixers, turbogas absorbers, cascade towers, and bubble columns. Such systems can be used both for contacting the gas containing hydrogen sulfide with the catalyst solution, and for contacting the oxygen-containing gas with the catalyst solution.

Methods and apparatus useful for contacting gas streams with chelated iron catalyst solutions are described in U.S. Pat. Nos. 4,036,942, 4,011,304, 3,676,356, which are incorporated herein by this reference.

Gas streams containing hydrogen sulfide and carbon dioxide can be treated effectively in accordance with this invention because the catalyst solution of this invention has little tendency to absorb carbon dioxide. Other gases, particularly basic gases such as ammonia which may tend to increase the pH of the chelated solution, can be removed from the gas stream before treatment in accordance with this invention, or can be periodically removed from the chelate solution, for example, by crystallization.

The gas stream to be treated can be contacted with the iron chelate catalyst solution in accordance with this invention over a wide range of temperatures and pressures. Any temperature from the boiling point of the solution down to the point at which it begins to freeze or at which iron salts begin to crystallize, can be used. Ambient or slightly elevated temperatures on the order of 20° to 90° C. are preferred. The absorption of hydrogen sulfide proceeds with best efficiency at temperatures of about 45° C. and higher. The regeneration of the solution with an oxygen-containing gas is also somewhat enhanced at moderately elevated temperatures on the order of 40° to 60° C. Any convenient pressure consistent with maintaining the iron chelate solution in liquid state may be used. It can be desirable to permit some evaporation of water from the solution in order to cool the system.

Any convenient oxygen-containing gas, such as pure oxygen or air, can be used in the regeneration of the iron chelate catalyst solution.

When gas streams containing high concentrations of hydrogen sulfide are treated, it may be preferable to carry out the absorption in one vessel and the regeneration step in a second vessel so that conditions may be optimized for each step. When gas streams containing low concentrations of hydrogen sulfide, on the order of a few percent, are treated and where dilution of the gas stream is not undesirable, it may be preferable to carry out both steps in a single apparatus using air as the oxygen-containing gas.

The absorption step is essentially quantitative and irreversible. The regeneration step, on the other hand, involves an equilibrium reaction which is affected by the partial pressure of oxygen, by the low solubility of oxygen in aqueous fluids, and by the rate of diffusion of the oxygen into the aqueous fluid. Thus, more intimate liquid-gas contact is required for the regeneration step than for the absorption step. Consequently, when both steps are performed in a single apparatus, the apparatus is designed to provide sufficient gas-liquid contact to effect the desired degree of regeneration, for example, to maintain 40-60 percent of the iron in the catalyst solution in the ferric oxidation state.

The hydrogen sulfide absorbed by the iron chelate catalyst solution is converted to solid, particulate sulfur which builds up in the solution as a slurry. The sulfur can be removed on an intermittent or continuous basis by any known technique such as filtration or centrifugation. Alternatively, the solution can be heated to melt the sulfur and the molten sulfur can then be separated by known techniques.

The following examples illustrate particular embodiments of the present invention.

EXAMPLE 1

An aqueous solution containing 0.7 M $Fe^{2+}$ (NTA) was prepared by dissolving ferrous sulfate in water and adding nitrilotriacetic acid in the trisodium salt form. The molar ration of nitrilotriacetic acid to ferrous ion was 1.05 to 1. The pH was adjusted to 4.0 by adding sulfuric acid, and precipitation of chelated iron was observed a few minutes later.

Another aqueous solution containing 0.7 molar chelated ferrous ion was prepared by dissolving ferrous sulfate and nitrilotriacetic acid in the trisodium sulfate form in a molar ratio of nitrilotriacetic acid to ferrous ion of 1.05 as described above. Triethylenetetramine was then added in a molar ratio of triethylenetetramine to ferrous ion of 0.3 to 1. The pH was then adjusted to 4.0 with sulfuric acid and no precipitation of chelated ferrous ion was observed. Similar experiments demonstrate that ethylenediamine in a molar ratio of 0.3 to 1; methylamine, dimethylamine and ethylamine in a molar ratio of 0.6 to 1; and ammonia in a molar ratio of 1 to 1 were effective in preventing precipitation of chelated ferrous ion at a pH of 4.0. Tertiary amines were found to be ineffective.

EXAMPLE 2

A chelated iron-catalyst solution containing 0.7 molar ferrous ion chelated with nitrilotriacetic acid in a molar ratio of nitrilotriacetic acid to ferrous ion of 1.05 to 1, and also containing 0.3 moles of triethylenetetramine per mole of ferrous ion was prepared and aerated with pure oxygen until all of the ferrous ion was oxidized to ferric ion. An increase of the pH from 4.0 to 4.2 was noted. Pure hydrogen sulfide gas was then sparged into the solution at room temperature with moderate agitation. The absorption of hydrogen sulfide was so rapid that no bubbles of hydrogen sulfide reached the surface of the solution until about 80 percent of the chelated ferric ion had been reduced to chelated ferrous ion.

EXAMPLE 3

The solution of Example 2 was placed in a stirred tank reactor and maintained at a temperature of 50° to 60° C. A gas stream containing about 2 volume percent hydrogen sulfide and about 8 volume percent oxygen was passed through the reactor. The fractional removal of the hydrogen sulfide from the gas stream generally exceeded 99 percent, and the fraction of iron in the ferric state varied from 40 to 60 percent of the total iron. The cumulative time of the experiment at these conditions was about 50 hours over a total elapsed time of about three months. The pH was maintained between 4 and 4.5 throughout the experiment. No pH drift due to sulfur oxidation was observed, and no addition of base or further addition of triethylenetetramine was required. The sulfur that was collected was quantitatively equivalent to the hydrogen sulfide removed from the gas stream, within the experimental accuracy of the experiment (±2%).

In a similar experiment, no degradation of such a solution was noted after 150 hours of operation spread over a period of six months.

The present invention has been described with reference to particular details and embodiments thereof, which are intended to illustrate the invention, the scope of which is defined in the following claims.

What is claimed is:

1. A process for the removal of hydrogen sulfide from gaseous streams which comprises:
   contacting a gaseous stream containing hydrogen sulfide with an aqueous solution of ferric ion chelated with an aminopolycarboxylic acid chelating agent at a pH of about 3.5 to 5, whereby hydrogen sulfide is oxidized to elemental sulfur and chelated ferric ion is reduced to chelated ferrous ion, the total concentration of ferrous and ferric iron in the aqueous solution being more than about 0.1 mole per liter of solution and the aqueous solution containing a salt selected from the group consisting of an ammonium salt of a strong mineral acid and an aliphatic, alicyclic, or heterocyclic primary or secondary amine salt of a strong mineral acid, said salt present in a sufficient proportion to maintain the thus formed chelated ferrous ion in solution.

2. A process as recited in claim 1 in which the aminopolycarboxcylic acid chelating agent is represented by the formula

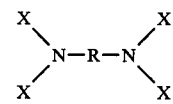

wherein from 2 to 4 of the groups X are lower alkyl carboxylic acid groups, from 0 to 2 of the groups X are selected from the group consisting of lower alkyl or hydroxyalkyl groups and

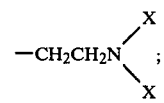

and R is a divalent organic group.

3. The process as recited in claim 1 in which the aminopolycarboxylic acid chelating agent is represented by the formula

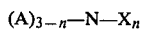

wherein n is 2 or 3; X is a lower alkyl caroboxylic acid group; and A is a lower alkyl or hydroxyalkyl group.

4. A process as recited in claim 1 in which the total ferrous and ferric ion concentration of the solution is between about 0.5 and about 1.0 mole per liter.

5. A process as recited in claim 1 wherein the amine is a mono- or di- lower alkyl or nyaroxyalkyl amine.

6. A process as recited in claim 1 wherein the amine is a cycloalkyl amine.

7. A process as recited in claim 1 wherein the amine is a lower alkylene polyamine.

8. A process as recited in claim 7 wherein the amine is triethylenetetramine.

9. A process as recited in claim 1 wherein the gaseous stream also contains alkyl mercaptans and the mercaptans are removed from the gaseous stream and are converted to alkyl disulfides in the aqueous solution.

10. A process as recited in claim 1 wherein chelated ferrous ion is oxidized to chelated ferric ion by contacting the aqueous solution with a gas containing elemental oxygen.

11. A process as recited in claim 10 wherein the aqueous solution is contacted with a gas stream containing both hydrogen sulfide and oxygen.

12. A process as recited in claim 1 wherein the amino polycarboxylic acid is selected from the group consisting of ethylenediamine tetraacetic acid, 1,2-diaminocyclohexane-N,N-tetracetic acid, diethylenetriamine pentaacetic acid, N-hydroxyethyl ethylenediamine triacetic acid, diglycine, hydroxyethyldiglycine, hydroxypropyldiglycine, 1,2-propylenediamine tetraacetic acid, 1,3-propylenediamine tetraacetic acid, and 1,2-diaminocyclohexane-N,N-tetraacetic acid.

13. A process as recited in claim 1 wherein the orgainc amine is selected from the group consisting of methylamine, ethylamine, propylamine, butylamine, isobutylamine, tertiary-butylamine, secondary-butylamine, dimethylamine, diethylamine, ethanolamine, diethanolamine, propanolamine, cyclopentylamine, cyclohexylamine, morpholine, piperidine, ethylenediamine, diethylenetriamine, triethylenetetramine, 1,2-propylenediamine, and 1,3-propylenediamine.

14. A process for the removal of hydrogen sulfide form gaseous streams which comprises:
contacting a gaseous stream containing hydrogen sulfide with an aqueous solution of ferric ion chelated with nitrilotriacetic acid at a pH of about 3.5 to 5, whereby hydrogen sulfide is oxidized to elemental sulfur and chelated ferric ion is reduced to chelated ferrous ion, the total concentration of ferrous ion and ferric ion in the solution being in the range of about 0.5 to 1.0 mole per liter, the solution containing a salt selected from the group consisting of an ammonium salt of a strong mineral acid present in a concentration of at least about one mole per mole of the thus formed chelated ferrous ion, an aliphatic, alicyclic or heterocyclic primary or secondary organic monoamine salt of a strong mineral acid and present in a concentration of at least about 0.6 mole per mole of the thus formed ferrous ion and an aliphatic, alicyclic or heterocyclic primary or secondary organic polyamine salt of a strong mineral acid present in a concentration of at least about 0.3 mole per mole of the bus formed chelated ferrous ion.

15. A process as recited in claim 14 wherein the aqueous solution containing chelated ferrous ion is contacted with a gas containing elemental oxygen, whereby chelated ferrous ion is oxidized to chelated ferric ion.

16. A process as recited in claim 15 wherein the polyamine is triethylenetetramine.

17. A process as recited in claim 14 wherein the gaseous stream also contains alkyl mercaptans and the mercaptans are removed from the gaseous stream and converted to alkyl disulfides in the aqueous solution.

18. A process as recited in claim 15 wherein the aqueous solution is contacted with a gas stream containing both hydrogen sulfide and oxygen.

19. A process as recited in claim 14 wherein the organic amine is selected from the group consisting of methylamine, ethylamine, propylamine, butylamine, isobutylamine, tertiary-butylamine, secondary-butylamine, dimethylamine, diethylamine, ethanolamine, diethanolamine, propanolamine, cyclopentylamine, cyclohexylamine, morpholine, piperidine, ethylenediamine, diethylenetriamine, triethylenetetramine, 1,2-propylenediamine, and 1,3-propylenediamine.

20. A process for the removal of hydrogen sulfide from gaseous streams which comprises:
contacting a gaseous stream containing hydrogen sulfide with an aqueous solution of ferric ion chelated with nitrilotriacetic acid at a pH of about 3.5 to 5, whereby hydrogen sulfide is oxidized to elemental sulfur and chelated ferric ion is reduced to chelated ferrous ion, the total concentration of ferrous and ferric iron in the aqueous solution being more than about 0.1 mole per liter of solution, the aqueous solution containing a salt selected from the group consisting of an ammonium salt of a strong mineral acid and an aliphtic, alicyclic, or heterocyclic primary or secondary amine salt of a strong mineral acid, said salt being present in a sufficient proportion to maintain the thus formed chelated ferrous ion in solution.

21. A process as recited in claim 20 wherein the aqueous solution containing chelated ferrous ion is contacted with a gas containing elemental oxygen, whereby chelated ferrous ion is oxidized to chelated ferric ion.

22. A process as recited in claim 21 wherein the aqueous solution is contacted with a gas stream containing both hydrogen sulfide and oxygen.

23. A process for the removal of hydrogen sulfide from gaseous streams which comprises:
contacting a gaseous stream containing hydrogen sulfide with an aqueous solution of ferric ion chelated with an aminopolycarboxylic acid chelating agent at a pH of about 3.5 to 5, whereby hydrogen sulfide is oxidized to elemental suflur and chelated ferric ion is reduced to chelated ferrous ion, the total concentration of ferrous and ferric iron in the aqueous solution being more than about 0.1 mole liter of solution and the aqueous solution containing a salt selected from the group consisting of a sulfate chloride or nitrate salt of ammonia or an aliphatic, alicyclic, or heterocyclic primary or secondary amine present in a sufficient proportion to maintain the thus formed chelated ferrous ion in solution.

24. A process as recited in claim 23 wherein the aqueous solution containing chelated ferrous ion is contacted with a gas containing elemental oxygen, whereby chelated ferrous ion is oxidized to chelated ferric ion.

25. A process as recited in claim 24 wherein the aqueous solution is contacted with a gas stream containing both hydrogen sulfide and oxygen.

26. A process for the removal of hydrogen sulfide from gaseous streams which comprises:
contacting a gaseous stream containing hydrogen sulfide with an aqueous solution of ferric ion chelated with nitrilotriacetic acid at a pH of about 3.5 to 5, whereby hydrogen sulfide is oxidized to elemental sulfur and chelated ferric ion is reduced to chelated ferrous ion, the total concentration of ferrous and ferric iron in the aqueous solution being more than about 0.1 mole per liter of solution and the aqueous solution containing a salt selected from the group consisting of a sulfate, chloride, or nitrate salt of ammonia or an aliphatic, alicyclic, or heterocyclic primary or secondary amine present in a sufficient proportion to maintain the thus formed chelated ferrous ion in solution.

27. A process as recited in claim 26 wherein the aqueous solution containing chelated ferrous ion is contacted with a gas containing elemental oxygen, whereby chelated ferrous ion is oxidized to chelated ferric ion.

28. A process as recited in claim 27 wherein the aqueous solution is contacted with a gas stream containing both hydrogen sulfide and oxygen.

29. A process as recited in claim 1 wherein the salt is an ammonium salt of a strong mineral acid present in the aqueous solution in a concentration of at least one mole per mole of the thus formed chelated ferrous ion; an aliphatic, alicyclic or heterocyclic primary or secondary organic monoamine salt of a strong mineral acid present in the aqueous solution in a concentration of at least about 0.6 mole per mole of the thus formed chelated ferrous ion, or an aliphatic, alicyclic or hetercyclic organic polyamine salt of a strong mineral acid present in the aqueous solution at a concnetration of at least about 0.3 mole per mole of the thus formed chelated ferrous ion.

30. A process as recited in claim 20 wherein the salt is an ammonium salt of a strong mineral acid present in the aqueous solution in a concentration of at least one mole per mole of the thus formed chelated ferrous ion; an aliphatic, alicyclic or heterocyclic primary or secondary organic monoamine salt of a strong mineral acid present in the aqueous solution in a concentration of at least about 0.6 mole per mole of the thus formed chelated ferrous ion, or an aliphatic, alicyclic or heterocyclic organic polyamine salt of a strong mineral acid present in the aqueous solution at a concentation of at least about 0.3 mole per mole of the thus formed chelated ferrous ion.

31. A process for the removal of hydrogen sulfide from gaseous streams which comprises:
contacting a gaseous stream containing hydrogen sulfide with an aqueous solution of ferric ion chelated with nitrilotriacetic acid at a pH of about 3.5 to 5, whereby hydrogen sulfide is oxidized to elemental sulfur and chelated ferric ion is reduced to chelated ferrous ion, the total concentration of ferrous ion and ferric ion in the aqueous solution being in the range of about 0.5 to 1.0 mole per liter, the solution containing a salt selected from the group consisting of a sulfate, chloride or nitrate salt of ammonia present in a concentration of at least about one mole per mole of the thus formed chelated ferrous ion; a sulfate, chloride or nitrate salt of an aliphatic, alicyclic or heterocyclic primary or secondary organic monoamine present in a concentration of at least about 0.6 mole per mole of the thus formed ferrous ion and a sulfate, chloride or nitrate salt of an aliphatic, alicyclic or heterocyclic primary or secondary organic polyamine present in a concentration of at least about 0.3 mole per mole of the thus formed chelated ferrous ion.

32. A process as recited in claim 31 wherein the aqueous solution containing chelated ferrous ion is cntacted with a gas containing elemental oxygen, whereby chelated ferrous ion is oxidized to chelated ferric ion.

33. A process as recited in claim 32 wherein the aqueous solution is contacted with a gas stream containing both hydrogen sulfide and oxygen.

34. A process for the removal of hydrogen sulfide from gaseous streams which comprises:
contacting a gaseous stream containing hydrogen sulfide with an aquoeus solution of ferric ion chelated with nitrilotriacetic acid at pH of about 3.5 to 5, wherein hydrogen sulfide is oxidixed to elemental sulfur and chelated ferric ion is reduced to chelated ferrous ion, the total concentration of ferrous ion and ferric ion in the solution being in the range of about 0.5 to 1.0 mole per liter, the solution containing a sulfate salt of triethylenetetramine present in a concentration of at least about 0.3 mole per mole of the thus formed ferrous ion.

* * * * *